United States Patent
Christmas

(10) Patent No.: US 11,938,816 B2
(45) Date of Patent: *Mar. 26, 2024

(54) IMAGE PROJECTOR

(71) Applicant: Envisics Ltd, Milton Keynes (GB)

(72) Inventor: Jamieson Christmas, Milton Keynes (GB)

(73) Assignee: Envisics Ltd, Milton Keynes (GB)

(*) Notice: Subject to any disclaimer, the term of this patent is extended or adjusted under 35 U.S.C. 154(b) by 612 days.

This patent is subject to a terminal disclaimer.

(21) Appl. No.: 15/734,439

(22) PCT Filed: Jul. 16, 2019

(86) PCT No.: PCT/EP2019/069090
§ 371 (c)(1),
(2) Date: Dec. 2, 2020

(87) PCT Pub. No.: WO2020/016214
PCT Pub. Date: Jan. 23, 2020

(65) Prior Publication Data
US 2021/0252978 A1    Aug. 19, 2021

(30) Foreign Application Priority Data
Jul. 17, 2018  (GB) .................................... 1811705

(51) Int. Cl.
*B60K 35/00*    (2006.01)
*G02B 27/01*    (2006.01)
*G03H 1/22*     (2006.01)

(52) U.S. Cl.
CPC .......... *B60K 35/00* (2013.01); *G02B 27/0172* (2013.01); *G03H 1/2205* (2013.01);
(Continued)

(58) Field of Classification Search
CPC .. G02B 27/01; G02B 27/017; G02B 27/0101; G02B 27/0103; G02B 27/0172;
(Continued)

(56) References Cited

U.S. PATENT DOCUMENTS

2010/0277566 A1   11/2010  Cable et al.
2015/0062446 A1    3/2015  Schreiber
(Continued)

FOREIGN PATENT DOCUMENTS

GB    2 534 151       7/2016
GB    2 551 870       1/2018
JP    2017067944 A    4/2017

OTHER PUBLICATIONS

International Search Report dated Sep. 26, 2019 for International Application No. PCT/EP2019/069090, 5 pages.
(Continued)

*Primary Examiner* — Sultan Chowdhury
(74) *Attorney, Agent, or Firm* — McDonnell Boehnen Hulbert & Berghoff LLP

(57) ABSTRACT

There is provided a head-up display for a vehicle having a window. The head-up display comprises a picture generating unit (410) and an optical system (420). The picture generating unit is arranged to output pictures. The optical system is arranged to receive the pictures output by the picture generating unit and project the pictures onto the window (430) of the vehicle to form a virtual image (450, 707) of each picture within a virtual image area (605). The picture generating unit is arranged to output pictures within a cropped picture area such that the virtual image area (605) has a corresponding cropped shape. FIG. 7 illustrates a perspective view of a three lanes road (501,502,503) onto which a virtual image (707) within a cropped virtual image area (605) is overlaid.

19 Claims, 11 Drawing Sheets

(52) U.S. Cl.
CPC .......... *G03H 1/2294* (2013.01); *B60K 35/23* (2024.01); *B60K 35/60* (2024.01); *B60K 2360/23* (2024.01); *B60K 2360/334* (2024.01); *B60K 2360/785* (2024.01); *G02B 2027/0178* (2013.01); *G03H 2222/12* (2013.01); *G03H 2223/14* (2013.01)

(58) Field of Classification Search
CPC .. G02B 27/0037; G02B 27/0056; G03H 1/02; G03H 1/2205; G03H 1/2249; G03H 1/2294; B60K 35/00
See application file for complete search history.

(56) References Cited

U.S. PATENT DOCUMENTS

| | | | |
|---|---|---|---|
| 2017/0115627 A1* | 4/2017 | Christmas | G03H 1/2294 |
| 2017/0269362 A1 | 9/2017 | Yamasaki | |
| 2017/0363869 A1 | 12/2017 | Christmas et al. | |
| 2018/0017788 A1 | 1/2018 | Sun | |
| 2020/0103670 A1* | 4/2020 | Cole | G03H 1/2294 |
| 2022/0121028 A1* | 4/2022 | Smeeton | G03H 1/02 |

OTHER PUBLICATIONS

United Kingdom Combined Search and Examination Report dated Jan. 15, 2019 for Great Britain Application No. 1811705.1, 6 pages.

\* cited by examiner

IMAGE PROJECTOR

CROSS-REFERENCE TO RELATED APPLICATIONS

This application is a U.S. national phase application of International Patent Application no. PCT/EP2019/069070 filed on Jul. 16, 2019, which claims the benefit of United Kingdom Patent Application no. GB 1811705.1 filed on Jul. 17, 2018.

FIELD

The present disclosure relates to a projector and a head-up display. More specifically, the present disclosure relates to a holographic projector and a head-up display for a vehicle such as an automotive vehicle. The present disclosure also relates to a method of holographic projection, a method of projecting a virtual image in a head-up display and a method of displaying a virtual image on a window such as a windscreen using a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example. Conventionally, a rectangular area (referred to herein as a virtual image area) is defined in the driver's field of view and the head-up display may display image content in this rectangular area.

SUMMARY

Aspects of the present disclosure are defined in the appended independent claims.

There is disclosed herein an improved HUD for an automotive vehicle. The HUD includes a picture generating unit. The picture generating unit may be arranged to generate a picture including information content, such as speed or navigation information. There is also provided an optical or projection system arranged to form a virtual image of the information content. The virtual image of the information content may be formed at a suitable viewing position for the driver such as within the driver's normal field of view whilst operating the automotive vehicle. For example, the virtual image of the information content may appear at a distance down the bonnet (or hood) of the vehicle from the driver. The virtual image of the information content is positioned so as not to adversely affect the driver's normal view of the scene. The virtual image of the information content may be overlaid on the driver's view of the real world. The information content is computer-generated and may be controlled or updated in real-time to provide real-time information to the driver.

The picture generating unit may comprise a holographic projector in which the picture is a holographic reconstruction of a computer-generated hologram. The picture may be formed on a light receiving surface which acts as a display surface. A HUD based on the holographic projector described in full below is able to deliver a much greater contrast ratio than currently available competing technologies because of the efficiency of the holographic process and its inherent suitability for use with a laser light source.

The head-up display may comprise a holographic processor. The picture may be a holographic reconstruction. The holographic processor may be arranged to output the computer-generated hologram to a spatial light modulator. The computer-generated hologram may be arranged to at least partially compensate for the shape of the windscreen of the vehicle.

The system may be arranged to form the virtual image of the picture using the windscreen by reflecting spatially-modulated light off the windscreen. The light source may be a laser and/or the light of the picture may be laser light. The spatial light modulator may be a liquid crystal on silicon spatial light modulator. The picture may be formed by an interference process of the spatially-modulated light at the light receiving surface. Each computer-generated hologram may be a mathematical transformation of a picture, optionally, a Fourier or Fresnel transformation. The computer-generated hologram may be a Fourier or Fresnel hologram. The computer-generated hologram may be a hologram computer-generated by a point cloud method. The spatial light modulator may be arranged to spatially-modulate the phase of the light from the light source. The spatial light modulator may be arranged to spatially-modulate the amplitude of the light from the light source.

However, some embodiments describe a picture generating unit based on holographic projection by way of example only. The present disclosure is equally applicable to any type of picture generating unit including a backlit liquid crystal display, a laser scanning display, a digital micro-mirror device "DMD", a fluorescent display and a plasma display.

There is provided a head-up display for a vehicle having a window. The head-up display comprises a picture generating unit and a projection engine. The picture generating unit is arranged to output pictures. The projection engine (or optical system) is arranged to receive the pictures output by the picture generating unit and project the pictures onto the window of the vehicle in order to form a virtual image of each picture within a (common) virtual image area. The picture generating unit is arranged to output pictures within a cropped picture area such that the virtual image area has a corresponding cropped shape.

It may be said that the virtual image area (or region or space) is a field of view. The picture generating unit, projection optics and eye-box of the system collectively define the size, shape and position of the virtual image area in accordance with optical design. It may be said that the virtual image area is projected down onto the road to form a light footprint on the road. If the picture area is fully illuminated, the virtual image area will be fully illuminated. That is, if the full area of the picture area is illuminated, the full area of the virtual image area will be illuminated. However, image content (e.g. a navigation arrow) may be displayed in a sub-region of the picture area in which case the projected virtual image will only appear in a corresponding sub-region of the virtual image area.

There is provided a head-up display for a vehicle having a window. The head-up display comprises a picture generating unit and a projection engine. The picture generating unit is arranged to output a picture. The projection engine is arranged to receive the picture output by the picture generating unit and project the picture onto the window of the vehicle in order to form a virtual image of the picture within a virtual image area. The picture generating unit is arranged to output the picture within a picture area having a cropped shape such that the virtual image area has a corresponding cropped shape.

There is provided a head-up display for a vehicle having a window, the head-up display comprises a picture generating unit and a projection engine. The picture generating unit is arranged to generate pictures. The projection engine is arranged to project the pictures onto the window in order to form a virtual image of each picture in the window, wherein the virtual images are formed within a common virtual image area having a cropped shape.

Conventionally, the virtual image area is rectangular. The inventor has questioned the assumption that the virtual image area should be rectangular and recognised that the limitations this places on the overall head-up display system are not justified and are, in fact, obstructive to development of the next generation of augmented reality head-up displays in vehicles. Notably, the inventor has recognised the value in cropping the virtual image area as set out in the present disclosure. The areas of the virtual image area which have been cropped out are not especially useful for displaying image content in a head-up display of a vehicle. In particular, one or two triangular portions of the lower region of the virtual image area are largely redundant because they are too close to the driver given the typical speeds at which the vehicle may be expected to travel. The advantages of removing these two triangular portions, in terms of the optical and space demands of the picture generating unit and projection engine, outweigh the disadvantage in terms of the inability to display image content in these areas. The inventor has challenged the fundamental assumptions of head-up display design and provided a head-up display which represents a significant break from convention as can understood by appreciating the prejudice in the field.

The picture generating unit may be arranged to only generate pictures within the cropped shape of the picture area. It may be said the picture area (e.g. holographic replay field) has been restricted. More specifically, the spatial extent of the picture area (e.g. holographic replay field) is restricted. Alternatively, or additionally, the picture generating unit further comprises a physical mask arranged to block light of the picture outside the cropped shape of the picture.

A primary purpose of the projection engine is to magnify the picture and relay it to the virtual image area. The projection engine may therefore be a magnification engine or magnification optic/s. There is substantially a one-to-one correlation between the picture and the virtual image. An aim is to shape the virtual image area and this may be conveniently achieved by driving the picture generating unit to only provide image content within the cropped shape. Therefore, it is possible to provide the head-up display in accordance with the present disclosure using a conventional system by simply changing the shape of the used picture area. That is, only software modifications are required.

Benefits of the head-up display in accordance with the present disclosure may be felt by arranging the projection engine to only project light of the picture within the cropped shape of the picture area. For example, the projection engine comprises at least one optical element (or optical component) having a shape cropped in accordance with the cropped shape of the picture area and/or virtual image area.

There is provided a method of reducing the volume of a head-up display. The head-up display comprises a picture generating unit, optical system and optical combiner. The picture generating unit is arranged to display picture content within a display area on a screen, wherein the display area has a quadrilateral shape. The optical system is arranged to direct light from the display area to an optical combiner. The optical combiner is arranged to reflect the light from the display area to an eye-box thereby forming a virtual image of the picture content. The method comprises restricting picture content to a sub-area of the display area. The method further comprises mapping the sub-area onto an optical component of the optical system to identify an active area of the component. The method yet further comprises shaping the component in correspondence with the active area to reduce the inactive area of the component.

There is provided a method of reducing the volume of a head-up display. The head-up display comprises a picture generating unit, optical system and optical combiner. The picture generating unit is arranged to display picture content within a quadrilateral area on a screen. The optical system is arranged to direct light from the quadrilateral area to an optical combiner. The optical combiner is arranged to reflect the light from the quadrilateral area to an eye-box thereby forming a virtual image of the picture content. The method comprises restricting picture content to a sub-area of the quadrilateral area. The method further comprises mapping the sub-area onto an optical component of the optical system to identify an active area of the component. The method yet further comprises shaping the component in correspondence with the active area to reduce the inactive area of the component.

There is also provided a head-up display system comprising a picture generating unit, an optical system and an optical combiner. The picture generating unit is arranged to display picture content within a sub-area on a screen, wherein the sub-area has a shape comprising at least five sides. The optical system is arranged to relay light from the sub-area. The optical combiner is arranged to receive the relayed light from the optical system and reflect the light to an eye-box thereby forming a virtual image of the picture content. At least one optical component of the optical system has a shape corresponding to the shape of the sub-area.

According to a first aspect of the invention, there is a head-up display. The head-up display comprises a picture generating unit and optical relay. The picture generating unit comprises a spatial light modulator, a hologram engine, a light source and a diffuser. The spatial light modulator comprising pixels arranged to display a hologram. The size and shape of the pixels define the size and shape of the corresponding holographic replay field. The hologram engine is arranged to output a hologram to the spatial light modulator. The hologram is configured such that the picture is restricted to a sub-area of the holographic replay field defined by the pixels. The hologram therefore effectively crops the holographic replay field. That is, the hologram forms a cropped holographic replay field. The size of the holographic replay field is reduced by selectively using only a sub-area of the total available holographic replay field area. The full capability of the spatial light modulator is therefore intentionally underused. This is unconventional. The light source is arranged to illuminate the hologram. The diffuser is arranged to receive spatially-modulated light from the spatial light modulator. A holographic reconstruction is therefore formed thereon the diffuser. The shape of the diffuser is cropped in correspondence with the shape of the sub-area. The optical relay comprises at least one mirror. The at least one mirror is shaped in correspondence with the shape of the diffuser. The pixels may be quadrilateral, such as square or rectangular, such that they provide a quadrilateral holographic replay field owing to diffraction. The holographic replay field is orthogonally orientated with respect to the pixels.

More generally, there is disclosed herein a head-up display comprising a picture generating unit arranged to form a picture and an optical relay arranged to form a virtual image of the picture. The picture generating unit may comprise a display device arranged to display an image and a picture content engine arranged to output a picture to the display Two significant advantages are achieved. Firstly, the physical size of the head-up display is reduced. Head-up displays are conventionally housed within the dashboard of the vehicle. Head-up displays are relatively large compared to other advanced systems in a vehicle because a large mirror and large optical throw are needed to achieve the necessary magnification. Real-estate within the cabin space—particularly within the dashboard volume—is highly valuable in modern vehicles containing many complex electronic systems and head-up displays are quite expensive in terms of real-estate. It is found that truncating or cropping at least one or two corners of the virtual image area delivers significant spacing saving because the at least one optical element of the projection engine may be correspondingly cropped. Secondly, as with any optical component, the perform of the optical component declines with distance from the optical axis. In particular, aberrations increase with distance from the optical axis. The outer most parts of the at least one optical element of the projection engine therefore have the most detrimental effect on image quality. The overall image quality is therefore improved by decreasing the size of the light footprint on the at least one optical element of the projection engine as described herein.

The cropped virtual image in accordance with the present disclosure may be a far field virtual image. The far field virtual image may convey navigation information. The head-up display may also be arranged to form a near field virtual image. The near field virtual image may convey speed information, for example.

The sub-area may have a shape comprising at least five sides. The shape may have six or eight sides. The shape may be irregular. At least one of the sides of the shape may be curved.

Mapping the sub-area onto an optical component of the optical system may comprise tracing rays of light which form the image from the sub-area of the screen to the optical component to identify a light footprint on the optical component corresponding to the active area. Shaping the component may comprise reducing the physical size of the component.

The head-up display may be housed in a vehicle. The optical combiner may be the windscreen of a vehicle housing the head-up display. The virtual image may overlay an area of the ground in front of the vehicle.

The step of restricting the picture content may comprise excluding a region of the quadrilateral display area which would otherwise form a virtual image overlaying an area closest to the vehicle and/or to one side of the quadrilateral display area. The method may further comprise reducing the physical size of the screen in correspondence with the sub-area. The picture generating unit may comprise a holographic projector. The sub-area may be a sub-area of the holographic replay field. The optical system may have optical power.

The at least one optical element (or component) may be reflective. This approach provides a compact system because a reflective optical element can be used to fold the optical path. The at least one optical element may be a mirror. The at least one optical element may have optical power such that each virtual image is a magnified image of the corresponding picture and/or the virtual image area is a magnified image of the picture area. The angle subtended by the virtual image area (from the eye-box area) may be 5 to 15 degrees, such as 10+/−2 degrees, at the widest point and 2 to 5 degrees, such as 3.5+/−0.5 degrees at the highest point. The picture area may be 20 to 120 mm, such as 55+/−15 mm, at the widest point and 10 to 50 mm, such as 25+/−10 mm, at the highest point. The at least one optical element may have a freeform optical surface configured to optically-compensate for the shape of the window such that the virtual image is not distorted by the window. The at least one optical element may therefore be multi-purpose which is good for keeping the component count down and reducing optical losses.

The cropped shape of the virtual image area may be formed from a rectangle by truncating one or two corners such that the cropped shape has at least five sides. The value of the lower regions of the virtual image area which have been cropped out is not warranted. In fact, the cropped shape of the virtual image area may comprise a multisided shaped (e.g. polygon) having at least one truncated corner such that the cropped shape has at least five sides. The cropped shape of the virtual image area may be formed by truncating two or four corners of a rectangular such that the cropped shape has at least eight or ten sides. An improved head-up display for augmented reality is provided.

The virtual image may be used to augment reality for the driver. The virtual image overlays an area of the road. It may be preferable for the overlaid area to be symmetric. However, because the driver is positioned to one side of the vehicle (i.e. the off-side), the inventor has recognised that it may be advantageous if the shape of the virtual image area is asymmetric. More specifically, the asymmetry of the virtual image area may be arranged to visually-compensate for the spatially-offset position of a driver within the vehicle. The asymmetry of the virtual image area may be arranged to overlay a symmetric region of space. The asymmetry may be provided changing the lengths of the sides of the virtual image area. For example, opposite sides of the shape may have a different length. Optionally, all opposite sides of the shape have a different length.

The picture generating unit may be of any type. The picture generating unit may be a holographic projector. The picture generating unit may comprise a light source and a spatial light modulator. The light source may be arranged to emit light. The spatial light modulator may be arranged to receive the light from the light source and spatially-modulated the light in accordance with computer-generated holograms displayed on the spatial light modulator to form a holographic reconstruction conforming to each picture. The holographic reconstruction is the picture. The holographic reconstruction may be formed in free space or may be formed on a surface such as a screen or diffuser. The picture generating unit may therefore further comprise a light-receiving surface arranged to receive the spatially-modulated light such that each holographic reconstruction conforming to a picture is formed thereon.

The window may be a windscreen. The head-up display may therefore provide the driver with useful information during driving by augmenting reality.

There is provided a method of displaying a virtual image on a window using a head-up display. The head-up display comprises a picture generating unit arranged to output pictures within a picture area. The head-up display also comprises a projection engine arranged to receive the pictures output by the picture generating unit and project each picture onto the window in order to form a virtual image of each picture within a (common) virtual image area. The method comprises restricting the picture area of the picture generating unit to a cropped shape such that the virtual image area has a corresponding cropped shape.

The method may further comprise arranging the picture generating unit to only generate pictures within the cropped shape of the picture area. The method may additionally or alternatively comprise masking the light of the picture outside the cropped shape of the picture. The method may further additionally or alternatively comprise arranging the projection engine to only project light of the picture within the cropped shape of the picture area. For example, the method may comprise reducing or minimising the physical size and shape of at least one optical element of the projection engine in accordance with the shape of the virtual image area. Accordingly, the volume of the head-up display is reduced.

There is disclosed herein a head-up display system comprising a picture generating unit, an optical system and an optical combiner. The picture generating unit is arranged to display picture content within a sub-area on a screen. The sub-area has a shape comprising at least five sides. The optical system is arranged to relay light from the sub-area. The optical combiner is arranged to receive the relayed light from the optical system and reflect the light to an eye-box thereby forming a virtual image of the picture content. At least one optical component of the optical system has a shape corresponding to the shape of the sub-area.

The term "corresponding" is used herein with respect to a pair of elements or components to reflect a general one-to-one correlation between a first element (e.g. area, shape or image) and a second element such that a change in the first element causes an equivalent change in the second element. Elements which are "corresponding" may be identical, or substantially identical, in shape. Elements which are "corresponding" may have the same, or substantially the same, general shape but different size. For example, the second element may be a perfect or imperfect magnification of the first element. The word "corresponding" is therefore further used to reflect that the general shape of the first element matches that of the second element. Differences between the first element and second element may be caused by imperfects in components of the system, such as optical aberrations or distortions, or counter-measures to imperfects such as correctional factors.

The term "light of the picture" is used herein to refer to the light which forms the picture. The "light of the picture" may be monochromatic or polychromatic. The "light of the picture" may be composite colour. For example, the "light of the picture" may comprise red, green and blue light. The "light of the picture" may be polarised.

In accordance with this disclosure a "laser-line selective filter" allows laser-line light to propagate on the optical path described but does not allow non laser-line light to propagate any further on the optical path. In other words, the "laser-line selective filter" removes non laser-line light from the optical system. For example, the "laser-line selective filter" may absorb non laser-line light. For example, a "laser-line selective filter" may be absorb all optical wavelengths except light having the laser-line wavelength. Alternatively, the filter may achieve this selective functionality by being preferentially transmissive or preferentially reflective, for example, to the laser-line light. Likewise, a "polarisation-selective filter" in accordance with this disclosure refers to a filter which removes light having the non-preferential polarisation from the optical system. The term "laser-line" is used to refer to a narrow bandwidth having a centre wavelength and a full-wave half-maximum of less than 30 nm, optionally less than 15 nm, further optionally less than 5 nm.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
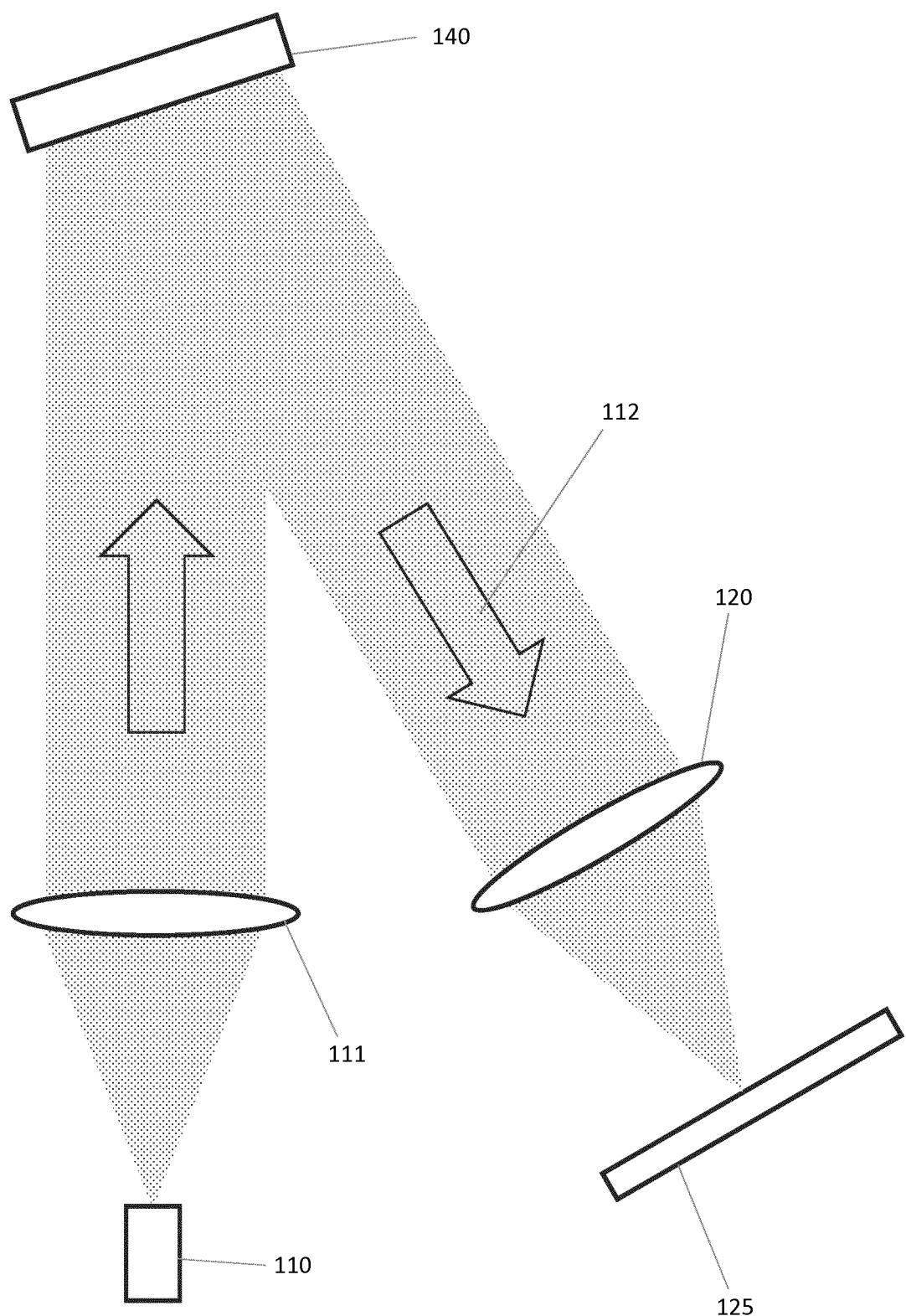
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wave-front of light to be incident on the SLM. In FIG. 1, the direction of the wave-front is off-normal (e.g. two or three degrees away from being truly orthogonal to the plane of the transparent layer). However, in other embodiments, the generally planar wave-front is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wave-front 112. The exit wave-front 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. A computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[U, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
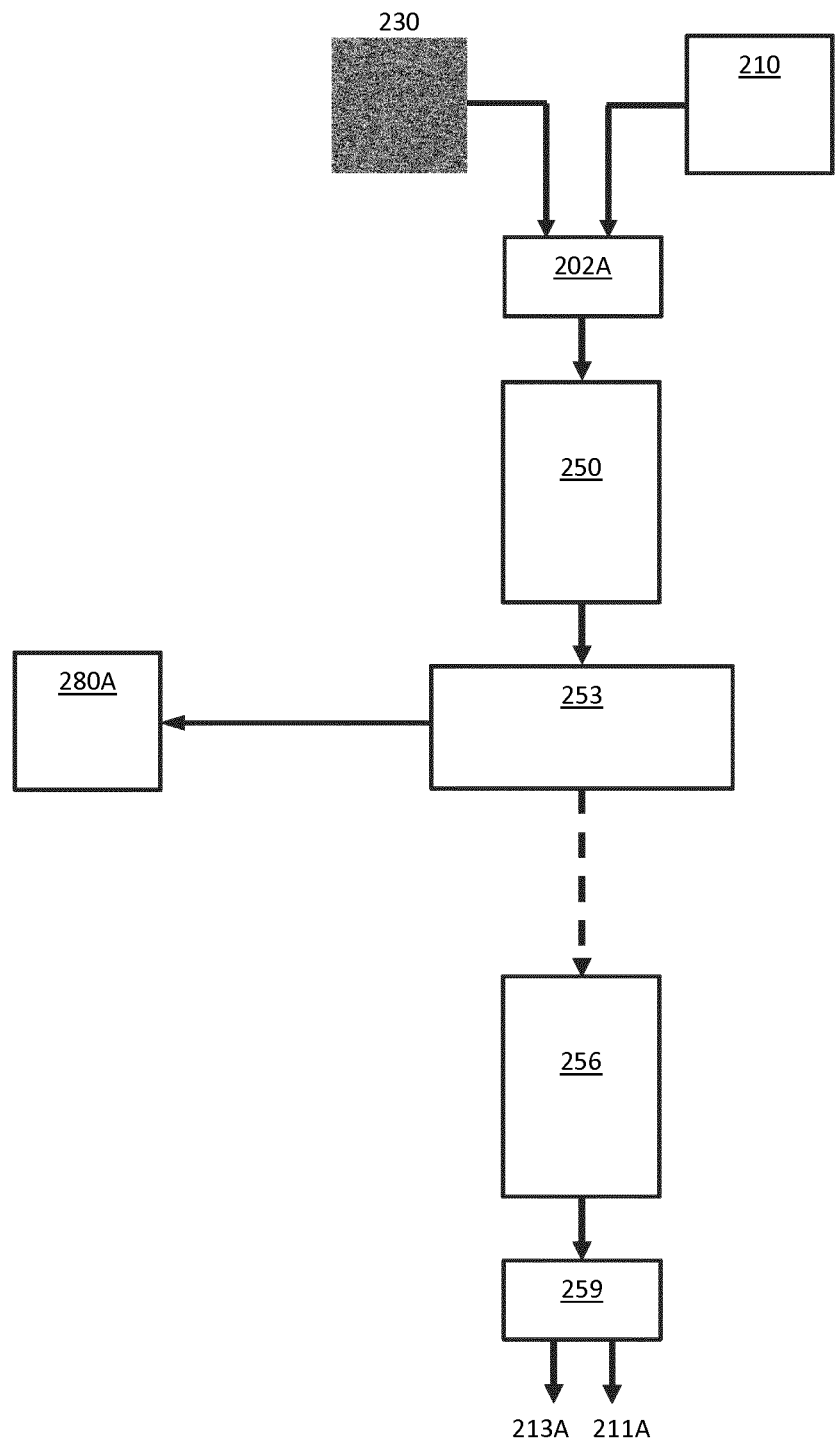
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may performed. However, this comparison step is not essential and in other embodiments, the number of iterations of the algorithm performed is predetermined or preset or user-defined.

Figure 2B:
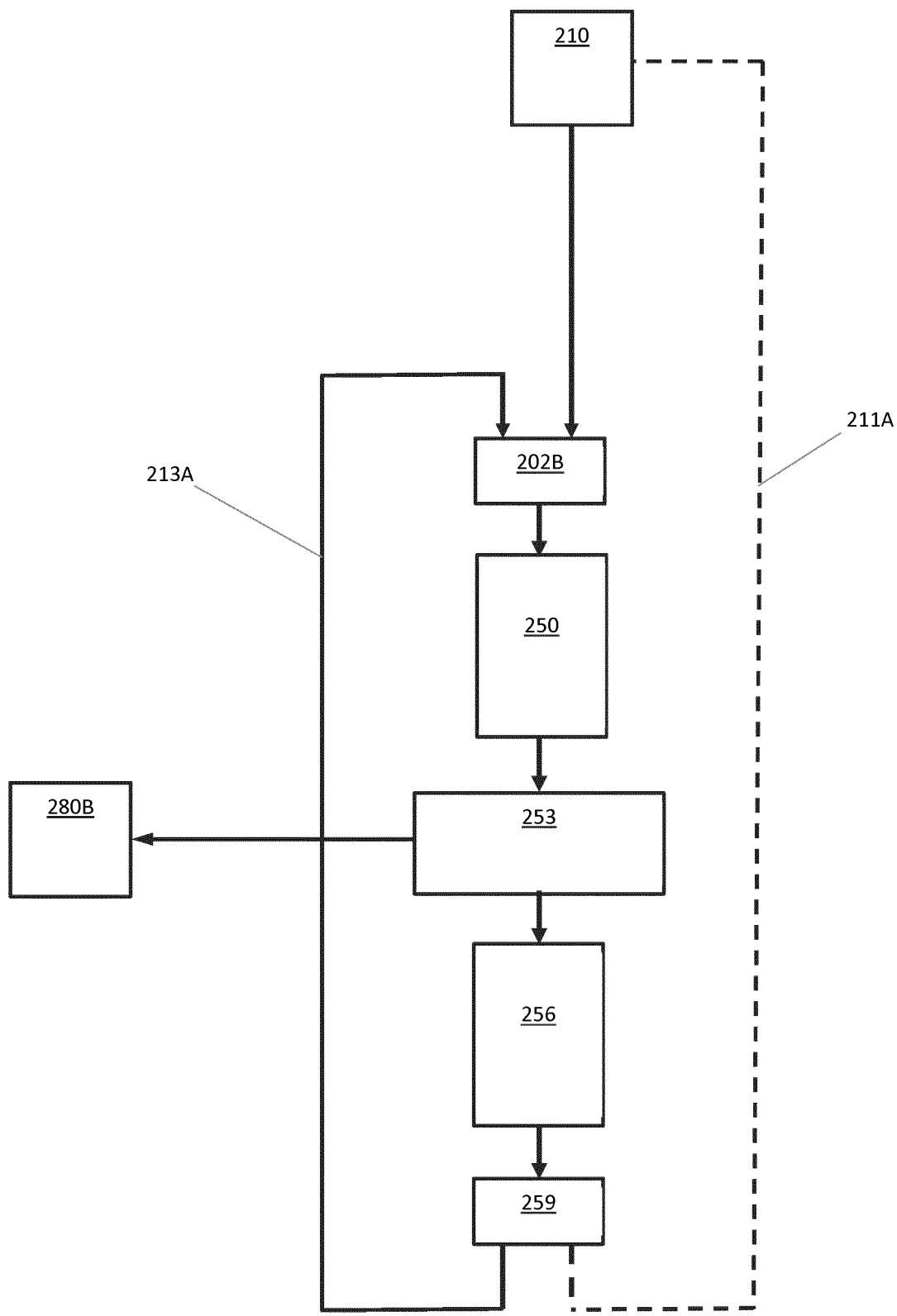
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
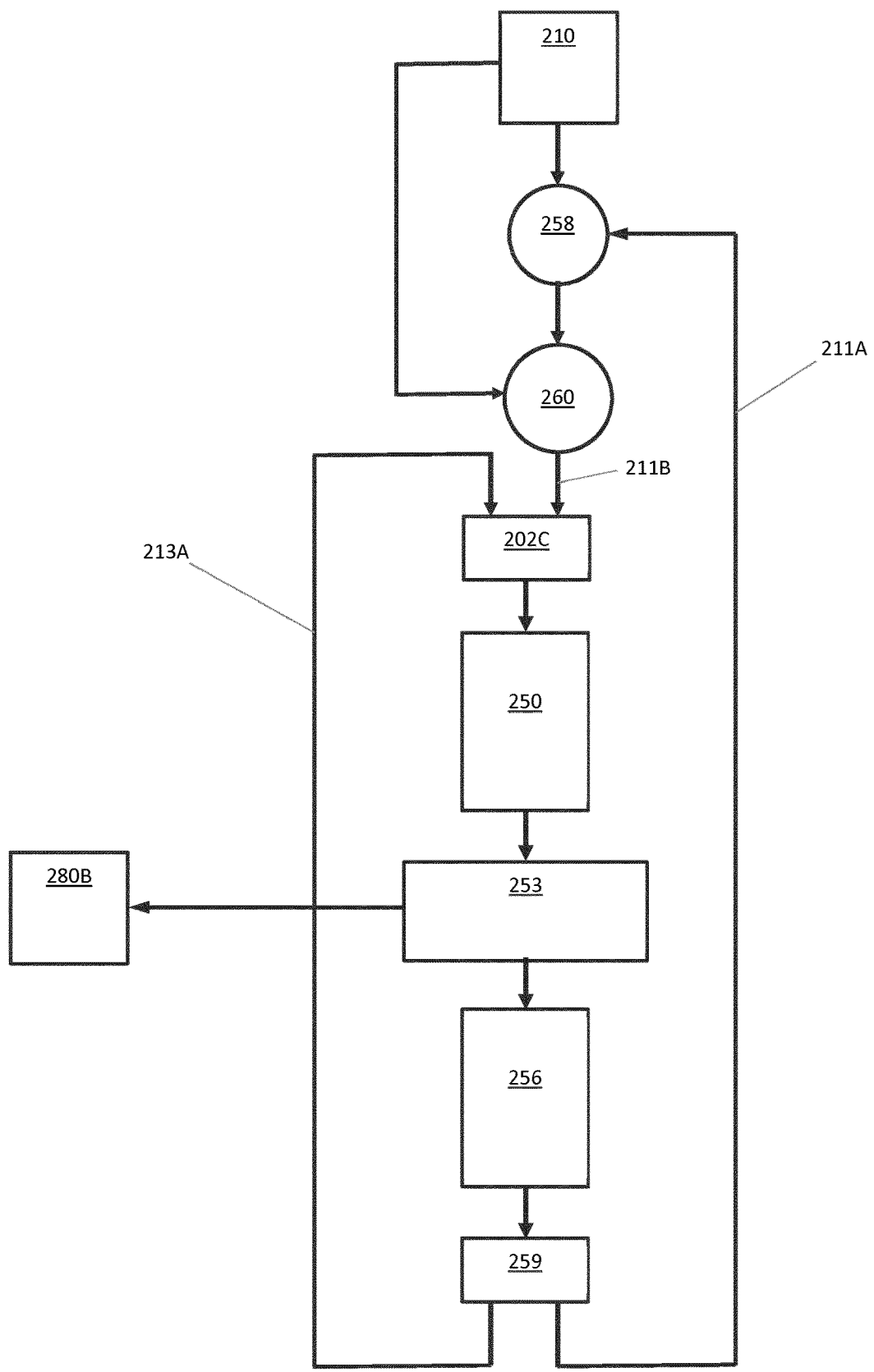
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
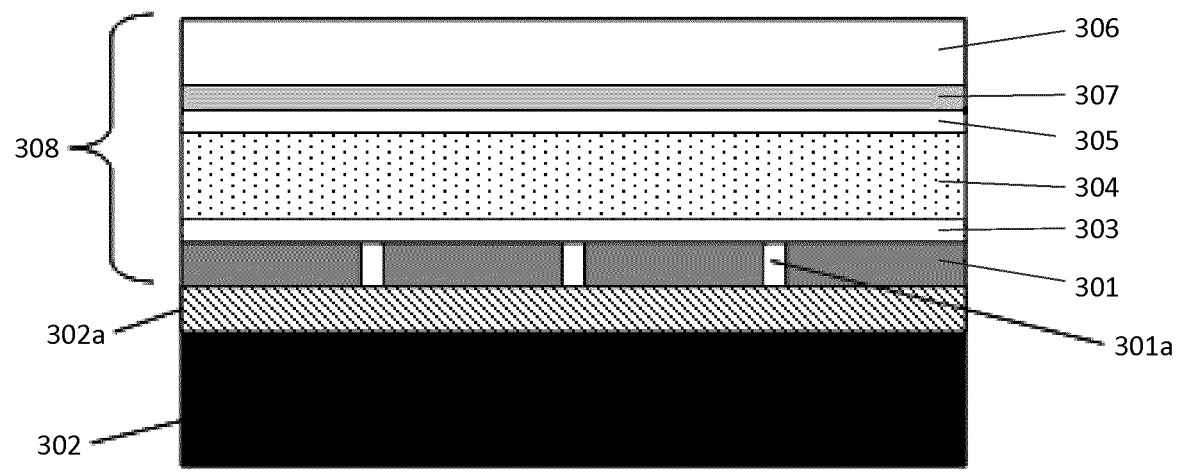
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wave-front, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Head-Up Display

Figure 4:
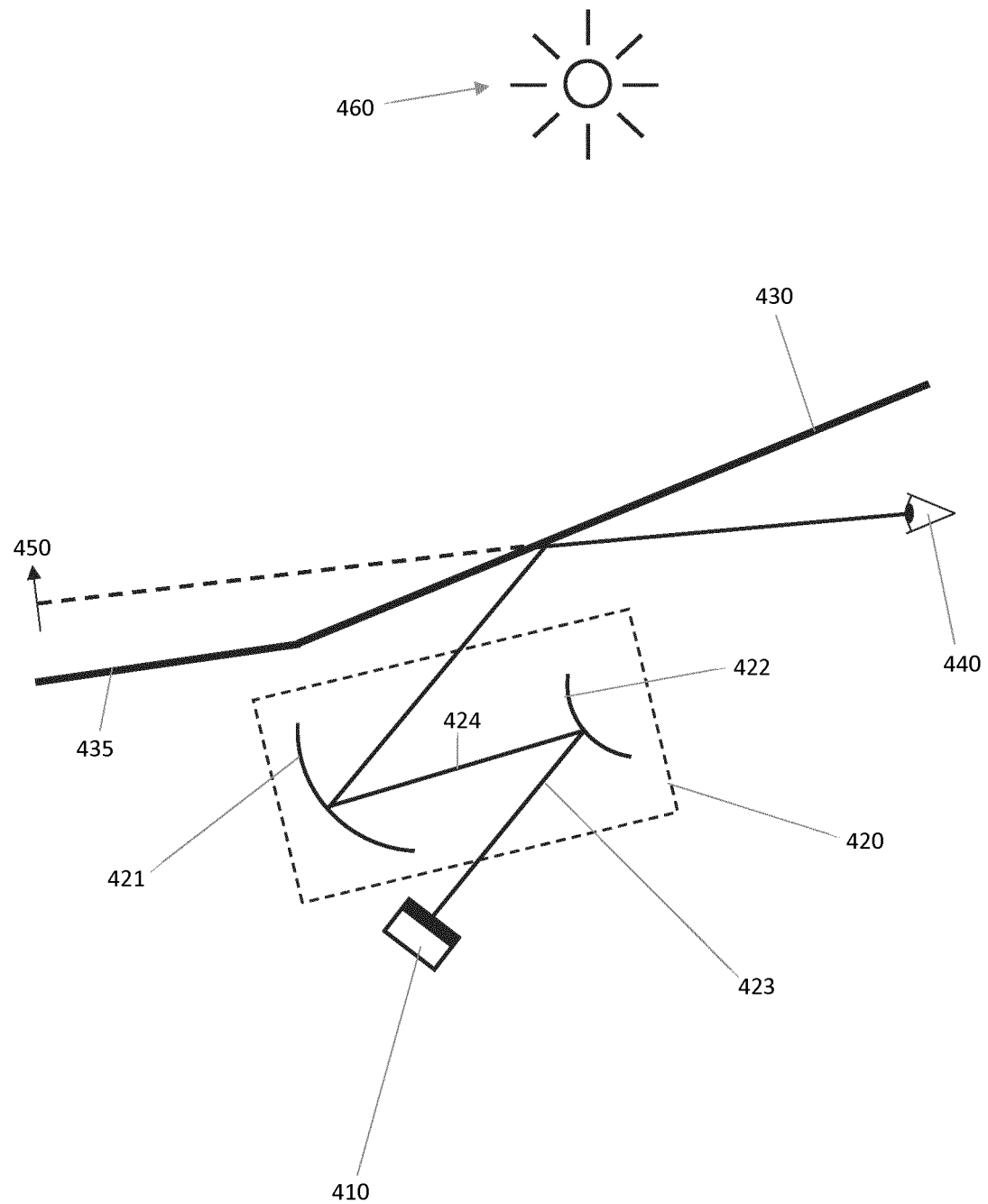
FIG. 4 shows an example HUD in a vehicle.

FIG. 4 shows a HUD in a vehicle such as a car. The windscreen 430 and bonnet (or hood) 435 of the vehicle are shown in FIG. 4. The HUD comprises a picture generating unit, "PGU", 410 and an optical system 420.

In this example, the PGU 410 comprises a light source, a light receiving surface and a processor (or computer) arranged to computer-control the image content of the picture. The PGU 410 is arranged to generate a picture, or sequence of pictures, on a light receiving surface. The light receiving surface may be a screen or diffuser. In some embodiments, the light receiving surface is plastic (that is, made of plastic).

The optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path 423 (or first optical path component) from the input to the second mirror 422 and a second optical path 424 (or second optical path component) from the second mirror 422 to the first mirror 421. There is, of course, a third optical path (or optical path component) from the first mirror to the output port but that is not assigned a reference numeral in FIG. 4. The optical configuration shown in FIG. 4 may be referred to as a "z-fold" configuration owing to the shape of the optical path.

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system is arranged to form the virtual image of each picture in the windscreen by reflecting spatially-modulated light off the windscreen. The user 440 of the HUD (for example, the driver of the car) sees a virtual image 450 of the picture in the windscreen 430. Accordingly, in embodiments, the optical system is arranged to form a virtual image of each picture on a windscreen of the vehicle. The virtual image 450 is formed a distance down the bonnet 435 of the car. For example, the virtual image may be 1 to 2.5 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real-world scene with light of the picture. It may therefore be understood that the HUD may provide augmented reality including a virtual image of the picture. For example, the augmented reality information may include navigation information or information related to the speed of the automotive vehicle. In some embodiments, the light forming the picture is output by incident upon the windscreen at Brewster's angle (also known as the polarising angle) or within 5 degrees of Brewster's angle such as within 2 degrees of Brewster's angle.

In some embodiments, the first mirror and second mirror are arranged to fold the optical path from the input to the output in order to increase the optical path length without overly increasing the physical size of the HUD.

The picture formed on the light receiving surface of the PGU 410 may only be a few centimetres in width and height. The first mirror 421 and second mirror 422 therefore, collectively or individually, provide magnification. That is, the first mirror and/or second mirror may have optical power (that is, dioptric or focusing power). The user 440 therefore sees a magnified virtual image 450 of the picture formed by the PGU. The first mirror 421 and second mirror 422 may also correct for optical distortions such as those caused by the windscreen 430 which typically has a complex curved shape. The folded optical path and optical power in the mirrors together allow for suitable magnification of the virtual image of the picture.

In embodiments, the PGU 410 comprises a holographic projector and a light receiving surface such as a screen or diffuser. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving surface. That is, in some embodiments, each picture is formed by interference of the spatially-modulated light at the light receiving surface.

Figure 5:
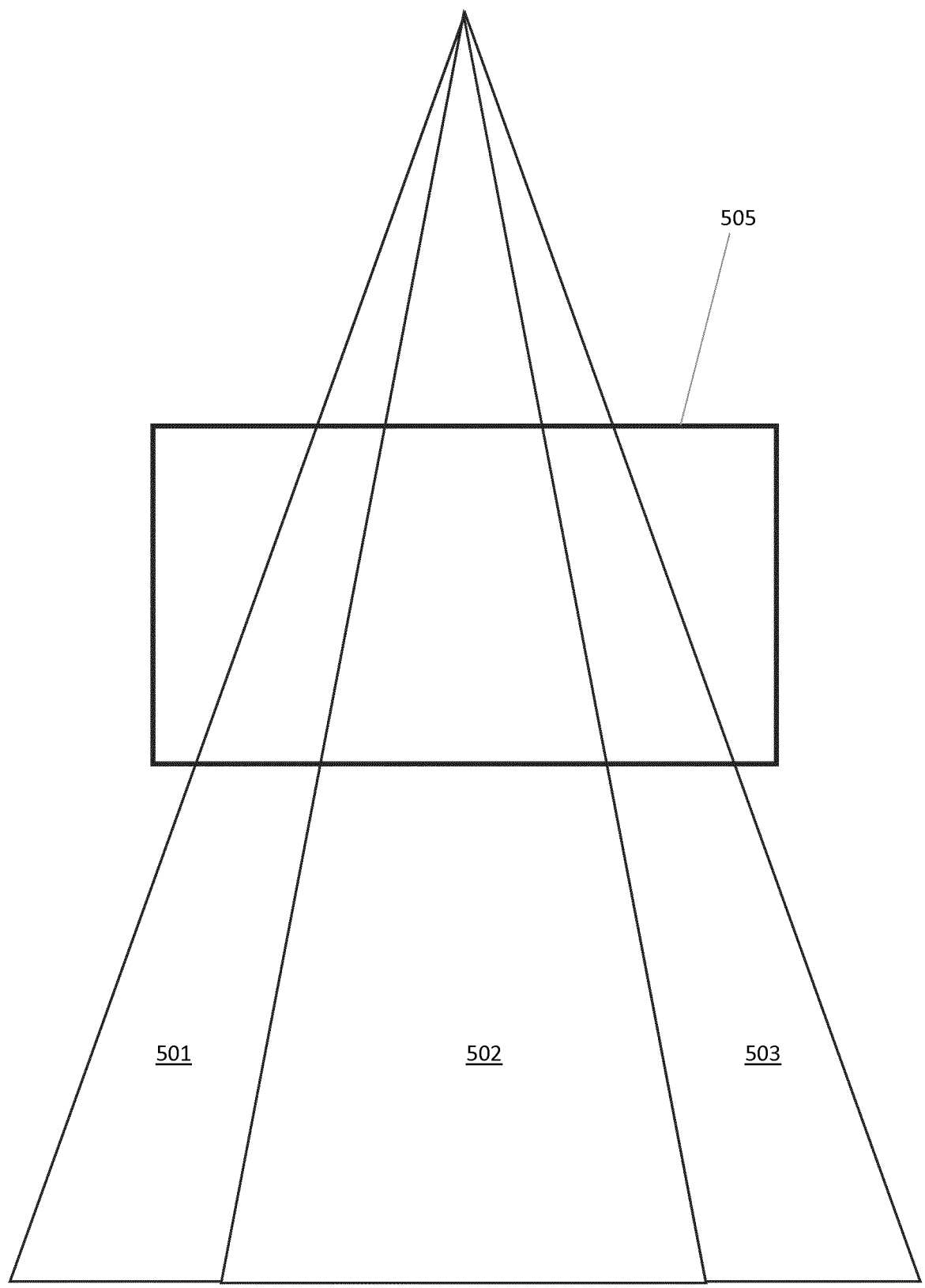
FIG. 5 is shows the field of view of a head-up display in accordance with the prior art.

FIG. 5 shows the far field virtual image area 505 of a prior art head-up display. The virtual image area 505 overlays a first lane 501, second lane 502 and third lane 503 of a carriageway or road. The traditional far field virtual image shape is rectangular. The picture generating unit displays a picture which is projected using the windscreen in order that the driver perceives a virtual image of the picture in front of them. The picture generating unit and projection engine are configured such that the virtual image content—e.g. speedometer or navigation information—is formed within at least one virtual image area. It may be said that the virtual image content overlays the scene at a distance, or range of distances, from the viewer.

Figure 6:
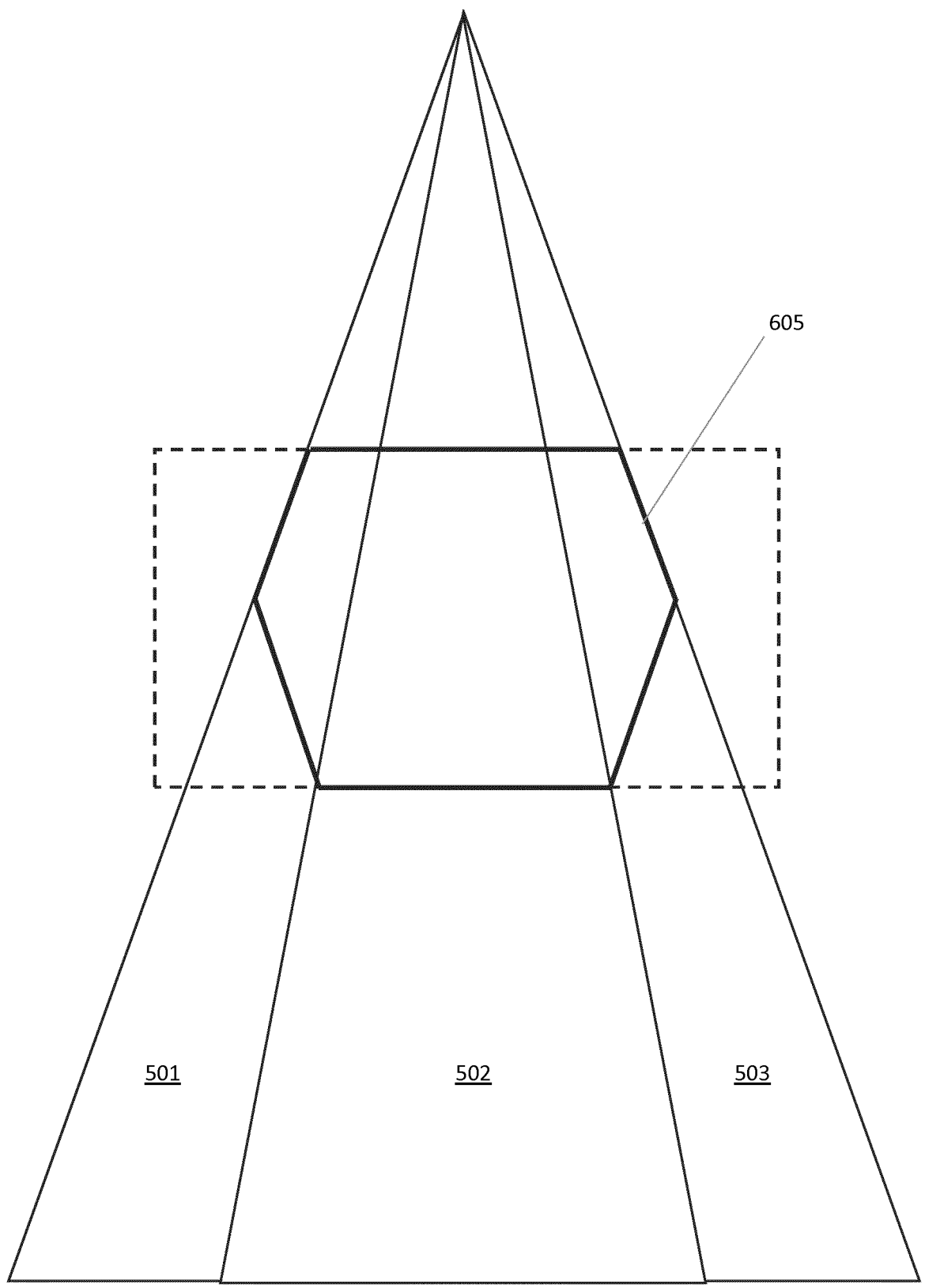
FIG. 6 shows an embodiment comprises a truncated field of view.
Figure 7:
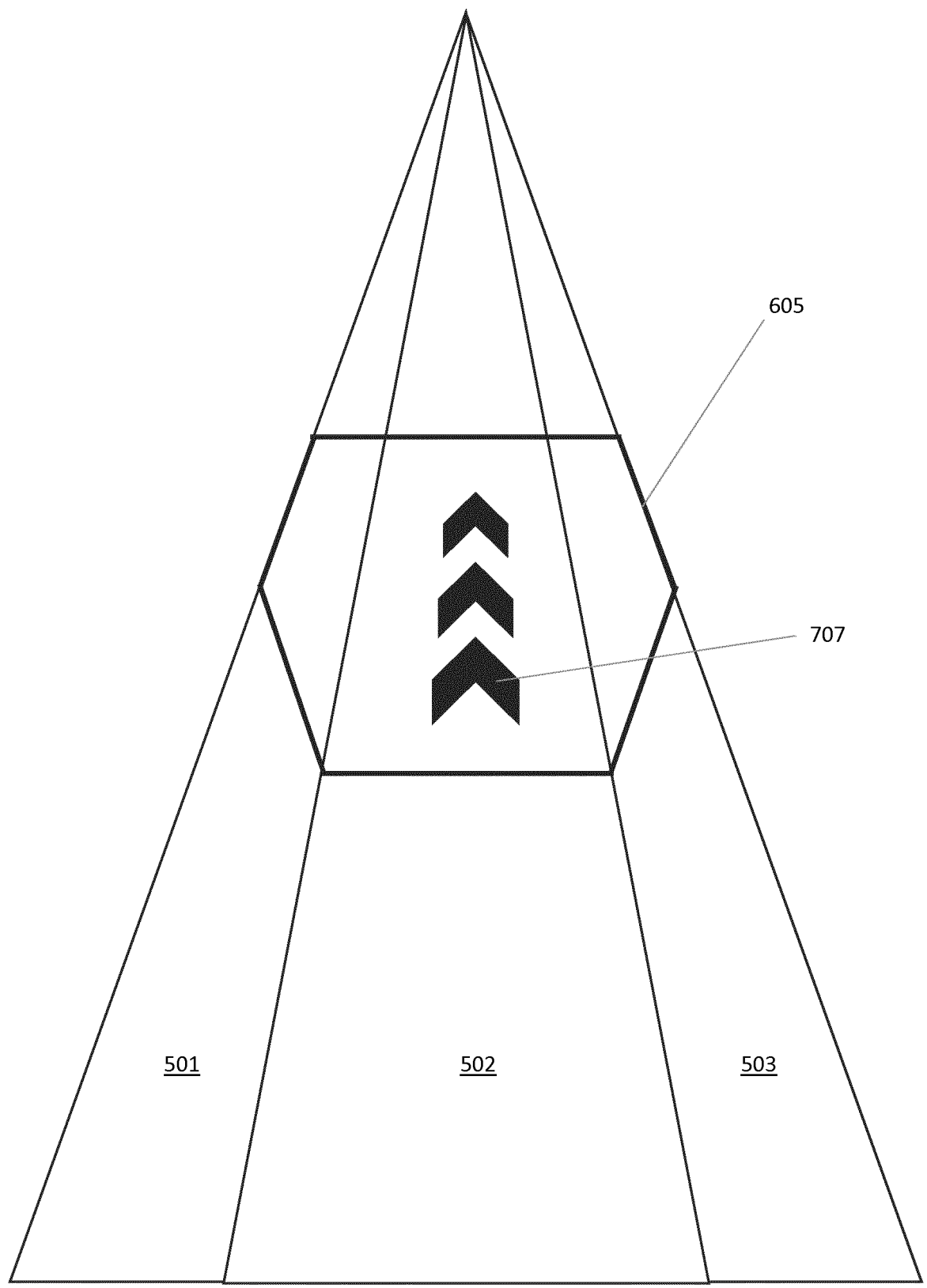
FIG. 7 shows an embodiment in which image content is displayed in the truncated field of view.

FIG. 6 shows an embodiment which breaks from convention by providing a non-rectangular virtual image area or field of view. FIG. 6 shows a virtual image area having a hexagonal shape. Specifically, the conventional rectangle has been trimmed to exclude regions outside the carriageway including chopping off the four corners to form a hexagonal virtual image area. The defined hexagon may be regular or irregular. In other embodiments, only two corners (e.g. the two lower corners) of the rectangle are truncated. As shown in FIG. 7, image content—such as chevrons 707 for navigation—may be displayed in the virtual image area. The image content may be confined to one lane—such as second lane 502—or it may extend over two or more lanes including first lane 501 and/or third lane 503.

Figure 8:
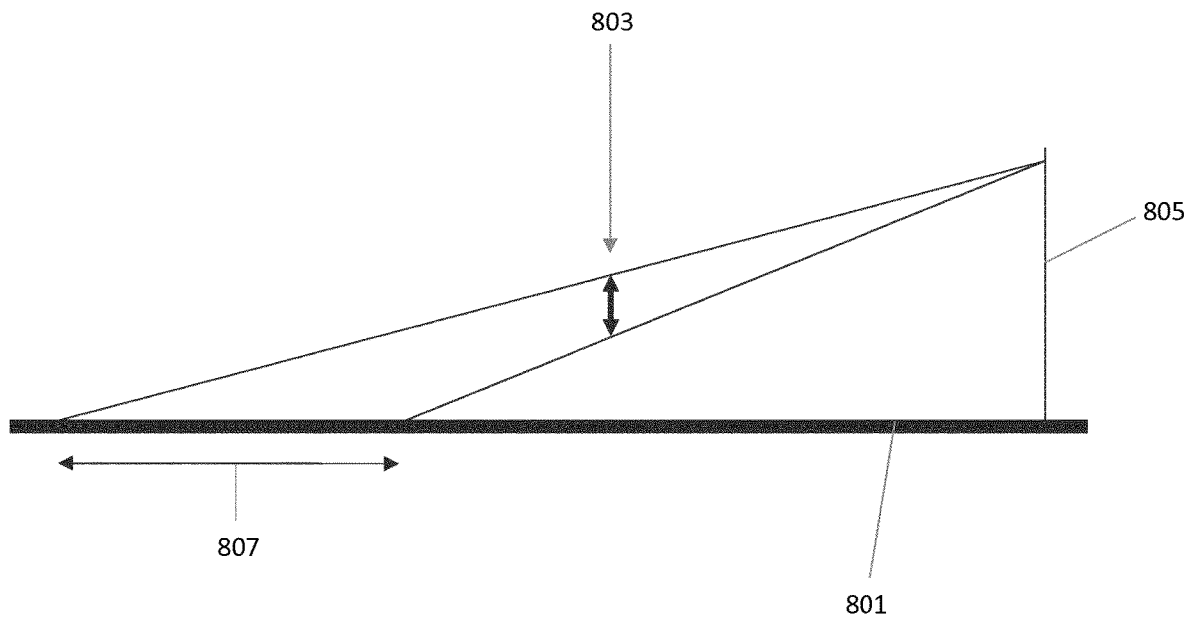
FIG. 8 shows the area overlaid by the field of view in accordance with some embodiments.
Figure 9:
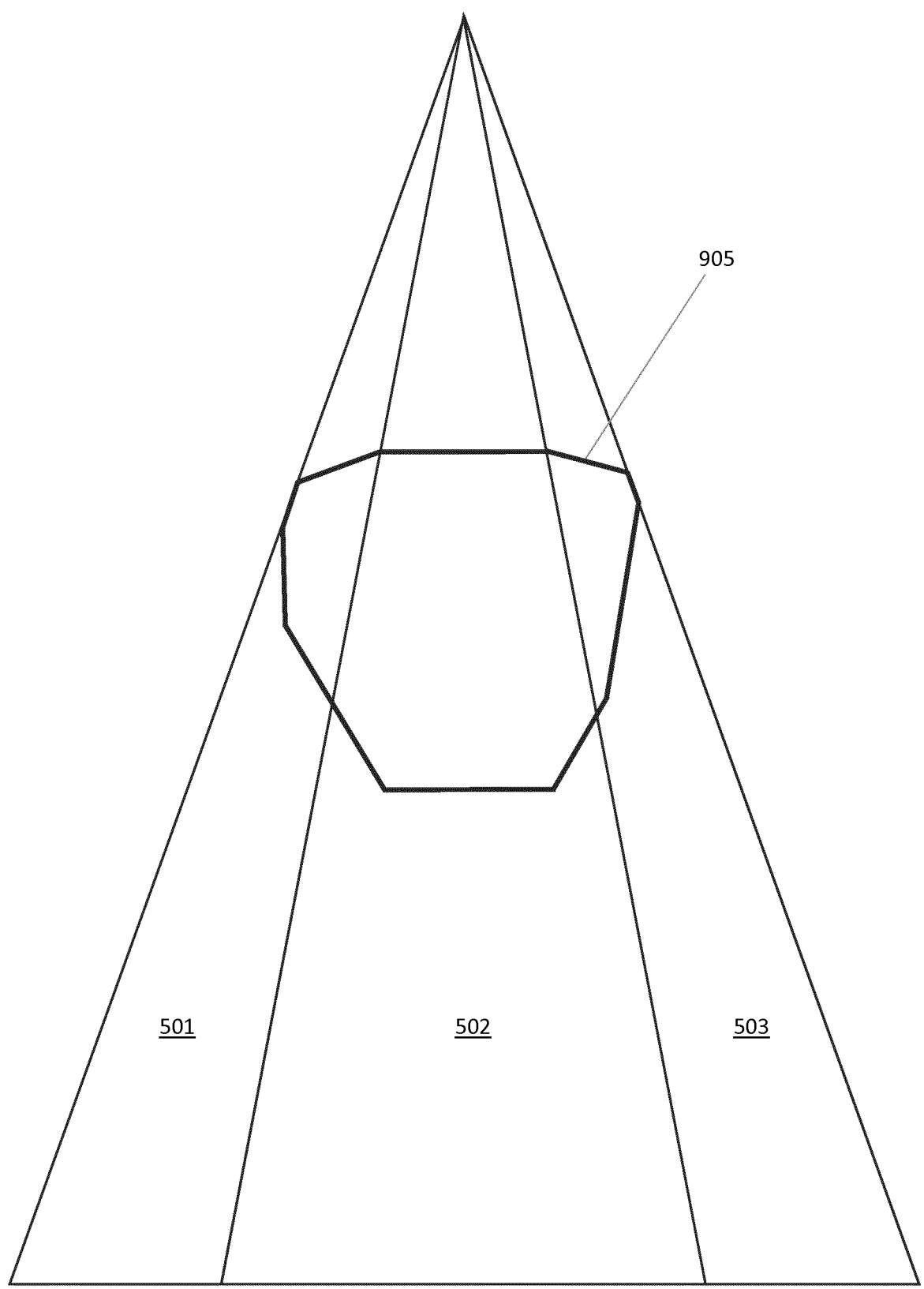
FIG. 9 shows an asymmetric field of view in accordance with some further embodiments.

FIG. 8 shows a side view of the system including a viewing plane 805 where the viewer—e.g. driver—may be positioned and a road 801 on which the vehicle including the head-up display is travelling. The viewing plane 805 may contain the eye-box. FIG. 8 shows how the virtual image 803 overlays an area 807 of the road 801. In this respect, the virtual image 803 may be considered as painting an area of the road in front of the vehicle with image content. The position of the virtual image 803 in space is determined by the optical configuration of the picture generating unit and projection engine.

The person skilled in the art of optical design for head-up display will understand how, using conventional ray-tracing, it is possible to design the optics of the picture generating unit and the optics of the projection engine to form the virtual image area in accordance with the present disclosure. In particular, in the present case, the person skilled in the art will understand how to trace bundles of light rays from all points in an eye-box to the virtual image area, back through optics of the projection engine (which may comprise one or two mirrors, for example) and to the picture on the picture generating unit in order to arrive at a viable optical design. An infinite number of different optical configurations may be used. The skilled person will understand how to use the size of the picture, the position of the viewer, the size/shape of the required eye-box and other design factors outside the scope of the present disclosure, such as the required physical volume of the head-up display, to arrive at an optical design based on FIG. 4. The person skilled in the design of optical design for head-up display will also understand how the optics of the projection unit may optionally be configured to compensate for any spatially-variant curvature of the window using a freeform optical surface, for example. These factors may make the optical design process involved but the process is routine for the person skilled in the art of optical design for head-up display.

By way of example only, in some embodiments, the projection engine comprises two mirrors as shown in FIG. 4. A first mirror provides the optical processing including the desired magnification and a second mirror provides a simple optical fold to increase path length. The optical design process therefore largely revolves around design the position of two mirrors and the optical power of the first mirror based on parameters of the system (see next paragraph). Again, the person skilled in the art of optical design for head-up display will understand how to design the mirrors to achieve the required magnification. The shape of the virtual image is determined by the shape of the picture and the picture generating unit can operated in the usual way to produce any desired picture and, in particular, confine picture content to within any shape such as the truncated shape in accordance with the present disclosure. No further details of how to display picture content within a cropped picture area is therefore required here.

By way of example only, in some embodiments, the following parameters may be used for the basis of the optical design process. In accordance with the examples that follow, an improved three-lane augmented reality head-up display for a vehicle is provided. In some embodiments, the virtual image is formed 5 to 20 metres, such as 15+/−2 metres, from the front of the vehicle. The angle subtended by the virtual image area (from the eye-box area) may be 5 to 15 degrees, such as 12+/−2 degrees, at the widest point and 2 to 5 degrees, such as 3.5+/−0.5 degrees at the highest point. The picture area may be 20 to 120 mm, such as 50+/−15 mm, at the widest point and 10 to 50 mm, such as 25+/−10 mm, at the highest point. The top side of the virtual image area may be arranged to overlay a region of space 50 to 150 metres, such as 75 to 125 metres or 100+/−10 metres, away from the vehicle. The bottom side of the virtual image area may be arranged to overlay a region of space 5 to 50 metres, such as 10 to 30 metres or 20+/−5 metres, away from the vehicle. The virtual image area may be arranged to overlay three lanes of traffic at these distances, wherein each lane has a width of 2 to 6 metres, such as 4+/−1 metres. The eye-box may be 100 to 150 mm in width, such as 125+/−5 mm, and 25 to 75 mm in height, such as 50+/−5 mm. The driver's eye point may be 1.25 to 1.75 metres, such as 1.5+/−0.1 metres, above the road.

In any of the described embodiments or groups of embodiments, the projection engine may include a plurality of optical elements such as a plurality of mirrors. For example, any component may be replaced by a plurality of components—e.g. two or three mirrors—which collectively perform the same functionality. For example, the optical processing provided by one optical element may be divided between a plurality of optical elements—e.g. mirrors. The skilled person will understand how any other conventional optics, such as lenses and filters, may be included in the projection engine to provide the HUD described.

In any of the described embodiments or groups of embodiments, the light of the picture may be narrowband (in wavelength) because a laser, such as a laser diode, is used as the light source. At least one of the optical components in the projection engine may therefore comprise a wavelength-selective filter, such as a laser-line filter, arranged to allow light of the picture to propagate through the optical system described but attenuate or eliminate light of other wavelengths from the optical system. For example, the first or second mirror in FIG. 4 may comprises a reflective laser-line filter arranged to reflect light of the picture but absorb or transmit light of other wavelengths such as light from sun including unwanted infrared and/or ultra-violet light.

Likewise, in any of the described embodiments or groups of embodiments, the light of the picture may be linearly polarised because a polarisation-sensitive device, such as a LCOS device, is used as the spatial light modulator. Therefore, at least one of the optical components in the projection engine may comprise a polariser or a polarising film, such as a polarising coating, to attenuate or eliminate stray light of the orthogonal polarisation such as sunlight of the orthogonal polarisation.

ADDITIONAL FEATURES

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser.

In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram)

is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three respective SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as an image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496, 108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of reducing the volume of a head-up display comprising a picture generating unit arranged to display picture content within a quadrilateral area on a screen and an optical system arranged to direct light from the quadrilateral area to an optical combiner, wherein the optical combiner is arranged to reflect the light from the quadrilateral area to an eye-box thereby forming a virtual image of the picture content, the method comprising:
   restricting picture content to a sub-area of the quadrilateral area;
   mapping the sub-area of the quadrilateral area onto an optical component of the optical system to identify an active area of the component; and
   shaping the optical component in correspondence with the active area to reduce the inactive area of the component;
   wherein the sub-area of the quadrilateral area has a shape comprising at least five sides.

2. The method as claimed in claim 1 wherein at least one of the sides is curved.

3. The method as claimed in claim 1 wherein mapping the sub-area onto an optical component of the optical system comprises tracing rays of light which form the image from the sub-area of the screen to the optical component to identify a light footprint on the optical component corresponding to the active area.

4. The method as claimed in claim 1 wherein shaping the component comprises reducing the physical size of the component.

5. The method as claimed in claim 1 wherein the virtual image is visible from within the eye-box, optionally, wherein eye-box is an area or volume.

6. The method as claimed in claim 1 wherein the optical combiner is the windscreen of a vehicle housing the head-up display.

7. The method as claimed in claim 1 wherein the virtual image overlays an area of the ground in front of the vehicle.

8. The method as claimed in claim 1 wherein the step of restricting the picture content comprises excluding a region of the quadrilateral area which would otherwise form a virtual image overlaying an area closest to the vehicle and/or to one side of the quadrilateral area.

9. The method as claimed in claim 1 wherein the picture generating unit comprises a holographic projector and the sub-area is a sub-area of the holographic replay field.

10. The method as claimed in claim 1 wherein the optical system has optical power.

11. A head-up display system comprising:
   a picture generating unit arranged to display picture content within a sub-area on a screen, wherein the sub-area has a shape comprising at least five sides, wherein the picture generating unit comprises
      a spatial light modulator arranged to display a hologram;
      a hologram engine arranged to output a hologram to the spatial light modulator;
      a light source arranged to illuminate the hologram; and
      a screen arranged to receive spatially-modulated light from the spatial light modulator such that a holographic reconstruction is formed thereon, wherein the hologram is configured such that the picture content of the holographic reconstruction is restricted to the sub-area thereof;
   an optical system arranged to relay light from the sub-area;
   an optical combiner arranged to receive the relayed light from the optical system and reflect the light to an eye-box thereby forming a virtual image of the picture content,
   wherein at least one optical component of the optical system has a shape corresponding to the shape of the sub-area.

12. The head-up display system as claimed in claim 11, wherein the optical system comprises at least one mirror shaped in correspondence with the shape of the sub area of the screen.

13. The head-up display system as claimed in claim 11 wherein the spatial light modulator comprises pixels arranged to display the hologram, wherein the pixels are quadrilateral such that they define a quadrilateral holographic replay field.

14. The head-up display system as claimed in claim 11 wherein the shape has six or eight sides.

15. The head-up display system as claimed in claim 11, wherein the shape is irregular.

16. The head-up display system as claimed in claim 11 wherein at least one of the sides is curved.

17. The head-up display system of claim 11 further comprising a windscreen of a vehicle, wherein the windscreen is arranged to function as an optical combiner of the optical relay.

18. The head-up display system as claimed in claim 17 wherein the the virtual image overlays an area of the ground in front of the vehicle.

19. A method of reducing the volume of a head-up display comprising a picture generating unit arranged to display picture content within a quadrilateral area on a screen and an optical system arranged to direct light from the quadrilateral area to an optical combiner, wherein the optical combiner is arranged to reflect the light from the quadrilateral area to an eye-box thereby forming a virtual image of the picture content, the method comprising:
   restricting picture content to a sub-area of the quadrilateral area;
   mapping the sub-area of the quadrilateral area onto an optical component of the optical system to identify an active area of the component;
   shaping the optical component in correspondence with the active area to reduce the inactive area of the component;
   wherein the step of restricting the picture content comprises excluding a region of the quadrilateral area which would otherwise form a virtual image overlaying an area closest to the vehicle and/or to one side of the quadrilateral area.

* * * * *